March 3, 1959 L. BENCE ET AL 2,876,272
DRY CELL
Filed April 15, 1955

INVENTORS.
LYNTON BENCE,
ROBERT H. PUGH AND
BY KARL S. WILLSON
Bosworth, Sessions, Herrström + Fawler
ATTORNEYS United States Patent Office 2,876,272
Patented Mar. 3, 1959

2,876,272

DRY CELL

Lynton Bence, Bay Village, Robert H. Pugh, Parma Heights, and Karl S. Willson, Cleveland, Ohio, assignors, by mesne assignments, to P. R. Mallory & Co., Inc., Indianapolis, Ind., a corporation of Delaware Application April 15, 1955, Serial No. 501,460

13 Claims. (Cl. 136—133)

This invention relates to dry cells and more particularly to dry cells of the type used in flashlights.

It is well known that ordinary dry cells of the Le Clanche type generate gases and that the volume of liquid and solid materials within the cells increase in service. The cells are subject to leakage of electrolyte from the cells and swelling and bulging of the cells because of the pressures developed within them. A general object of the present invention, therefore, is to provide improved dry cells which are leakproof under all ordinary conditions likely to be encountered in service and which will not swell or bulge substantially in service. More specifically, an object of the invention is to provide dry cells of the paper lined type which are leakproof under all ordinary conditions likely to be encountered in service, which will not bulge or swell under such conditions, and which can be manufactured at reasonable cost. Another object is the provision of such cells which will have good capacity and shelf life characteristics.

Other objects and advantages of the invention will become apparent from the following description of a preferred form thereof, reference being made to the accompanying drawing in which.

Figure 1:
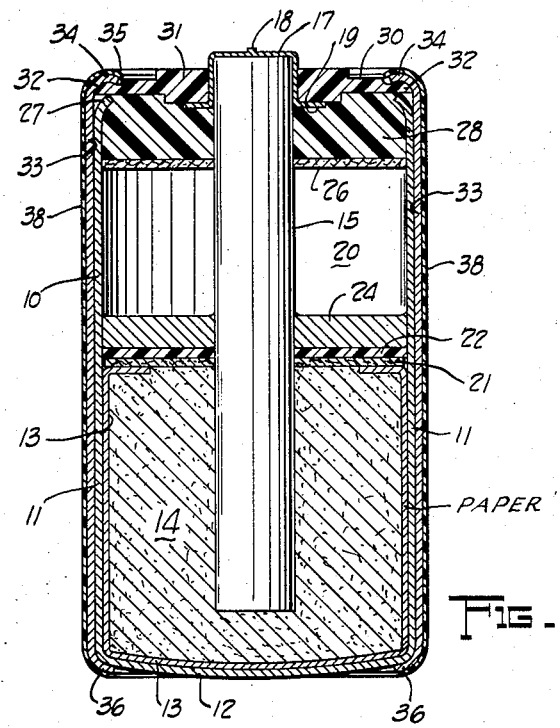
Figure 1 is a sectional elevational view of a preferred form of flashlight cell embodying the invention, parts being broken away to show the internal construction of the cell.

The thicknesses of certain components are exaggerated.

As shown in the drawing, the basic construction of a cell embodying the invention is generally conventional; the cell comprises a zinc can 10 constituting one of the electrodes of the cell and the container for the remaining elements of the cell; the can preferably is a drawn zinc cup that is circular in cross section and has a cylindrical side wall 11 of somewhat greater thickness than conventionally employed in flashlight cells and a bottom 12 of slightly greater thickness than the cylindrical side wall 11. The zinc can is lined with the usual paper separator 13 within which is disposed a mass of depolarizing mix 14 having a carbon electrode 15 embedded therein. The carbon electrode projects above the top of the cell; the upper end of the carbon electrode 15 is enclosed in a metal cap 17 having a vent 18 and a horizontal flange 19.

The paper liner, as is customary, is impregnated with an electrolyte paste comprising, for example, a cereal paste containing the usual electrolyte, the paste being of a gelatinous consistency. Instead of cereal paste, other pastes or gel-forming materials may be used; for example, natural gums such as gum tragacanth, jaguar gum, and the like, and synthetic gums such as methylcellulose, carboxymethylcellulose, polyvinyl, alcohol, and other like materials may be employed. These and like materials are hereinafter referred to as "gelatinous, electrolyte-absorbing materials." They should have the ability to form a gelatinous mass, i. e., a paste or gel, with water, and should not contain any materials that would deleteriously affect the cell. The paper liner extends across the bottom 12 of the can 10 so that the bottom of the can is utilized as part of the active surface of the zinc electrode.

In operation, cells of this type generate hydrogen gas which must be relieved to prevent undue pressure from being developed within the cell and also, the chemical reactions taking place within the cell produce a thin, watery spew which is difficult to retain within the cell while permitting gases to be vented therefrom. The spew generated in paper lined cells is much less viscous, and hence more difficult to control, than the spew produced in bag type cells.

According to the present invention, difficulties that have been encountered with prior types of paper lined cells are eliminated by providing a slightly larger than usual expansion space 20 within the cell and above the mix cake and disposing within this space and adjacent the mix cake additional electrolyte paste or a paste or gel comprising another gelatinous electrolyte-absorbing material which acts to absorb the thin, watery spew generated in the operation of the cell and thicken it sufficiently to prevent likelihood of leakage from the cell. The construction preferably includes a washer 21 composed of cardboard or the like disposed on top of the mix cake 14 and a sub-seal 22 of soft wax immediately above the washer. Seal 22 consists of a thin layer of a soft plastic material which adheres firmly to both the zinc container 10 and the carbon electrode 15 and remains sufficiently soft and plastic under usual temperature conditions that gases and thin liquids under pressure can pass through it in the form of small bubbles and droplets. Thus, gases and thin spew generated in the operation of the cell can pass through the soft wax seal 22 into the expansion space 20, but the seal prevents loss of moisture from and entrance of air into the active materials of the cell during shelf life.

A satisfactory material for the seal consists of an asphaltic or bituminous composition having the following characteristics as determined by standard A. S. T. M. testing procedures:

Softening point (A. S. T. M. test No. D–36) 173° F.
Penetration at 77° F. (A. S. T. M. test No. D–5) 29 cm.
Ductility at 77° F. (A. S. T. M. test No. D–113) 3.9 cm.
Stormer viscosity (100 grams wt. 100 R. P. M.)
    19 seconds at 350° F.
    31 seconds at 320° F.
    46 seconds at 300° F.

A material sold as "Bi-wax" No. B–1128 by the Bi-wax Corporation of Skokie, Illinois, meets these requirements. Various other materials may be employed and the characteristics set forth above can be varied within reasonable limits without greatly affecting the results.

In order to immobilize and thicken the spew emitted from the active material of the cell, a layer 24 of gelatinous electrolyte-absorbing material is disposed immediately above the soft plastic seal 22. Layer 24 may or may not contain the salts ordinarily included in an electrolyte paste. Thus, layer 24 may be composed of conventional cereal electrolyte paste, or may be composed of another gelatinous, electrolyte-absorbing material such as those listed above, together with the usual electrolyte, or it may be composed of a gelatinous, electrolyte-absorbing material listed above and water without the usual electrolyte salts. In any event, the layer is of a pastey or gelatinous consistency and has the ability to absorb and immobilize watery spew coming in contact with it. In operation of the cell it absorbs the spew exuded from the active materials, the paste becomes thinner than it was originally, but remains sufficiently thick and gelatinous so that it is comparatively easy to prevent the mixture of paste and spew from leaking from the cell.

In order to seal the expansion space 20 and provide a top closure or seal for the cell, a fiber, kraft paper or chipboard washer 26 is impaled upon the carbon electrode 15 and disposed a slight distance below the upper edge 27 of the zinc can 10. The upper edge 27 of the can is deformed inwardly as shown and then a conventional wax seal 28 is poured in on top of washer 26. Preferably, the flange 19 of cap 18 engages the central portion of upper surface of the wax seal 28 while the remainder of the upper surface of the wax is protected and the entire seal reinforced by a plastic disc or top 30. The top 30 is embedded in the wax seal; the thickened central portion 31 of the top overlies the flange 19, and the peripheral edge 32 of the top extends over the turned-in upper edge 27 of can as shown. The side walls of the cell are protected and enclosed by a tubular sleeve 33 which preferably is composed of a thin sheet steel lithographed to provide a label for the cell, but may be composed of any suitable material, such as cardboard or an appropriate vinyl or cellulose acetate butyrate plastic. The uper end of the sleeve 33, in any event, is turned in as at 34, engaging within the groove 35 in the top 30; the lower end of the sleeve is turned in as at 36 to engage the bottom 12 of the can so that the sleeve is retained securely in place.

When a steel or other metal sleeve is employed, the exterior is preferably insulated by a thin plastic tube 38. Insulation is required for most services because the sleeve 33 is not insulated from the zinc; a transparent plastic, such as a vinyl tube which may be heat-shrunk onto the cell is preferred.

In most leakproof dry cells embodying steel outer sleeves, it is necessary to insulate in the outer steel sleeves from the zinc containers by comparatively thick, asphalt-impregnated paper liners or to provide absorbent paper liners within the steel sleeves. The exterior diameter of the cells must not exceed a predetermined standard; therefore, the presence of the paper liners makes it necessary to reduce the size and cubic capacity of the zinc containers.

In the present cell, the zinc can 10 has a side wall of such thickness that perforation of the side walls is unlikely to occur under any ordinary circumstances, and since liquid is prevented from exuding from the cell in the area of the upper wax seal, there is no necessity to include an electrolyte-proof or absorbent liner between the zinc and the steel sleeve. Accordingly, the diameter, and hence, the cubic capacity of the zinc cup can be increased as compared to prior types of leakproof cells. Because of the increase in cubic capacity, it is possible to put into the zinc can a sufficient amount of mix 14 to give the desired electrical capacity to the cell while still maintaining the expansion space 20 at a greater percentage of volume of the cell than is customary. Because of the relatively greater size of the expansion space, high pressures are not developed within the cell in service and there is ample space to accommodate the increase in the volume of solid and liquid materials in the cell during service.

Gases generated in service can pass through the carbon 15, which is of controlled porosity and is arranged to vent gases without permitting the passage of viscous liquids. Gases flowing through the carbon electrode 15 are discharged from the vent 18 or find their way to the exterior around the cap 17 and between the cap 17 and the plastic cap 30. Inasmuch as the liquid generated in the operation of the cell is thickened by the paste 24, it cannot pass through the porous carbon and is retained within the expansion space by the wax seal 28.

Figure 2:
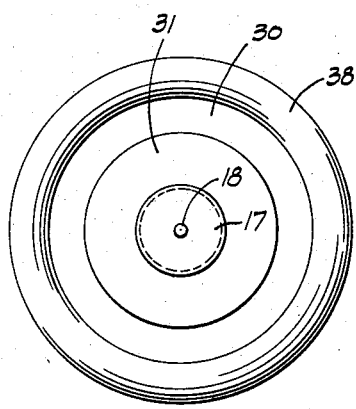
Figure 2 is a top plan view of the cell shown in Figure 1.
Figure 3:
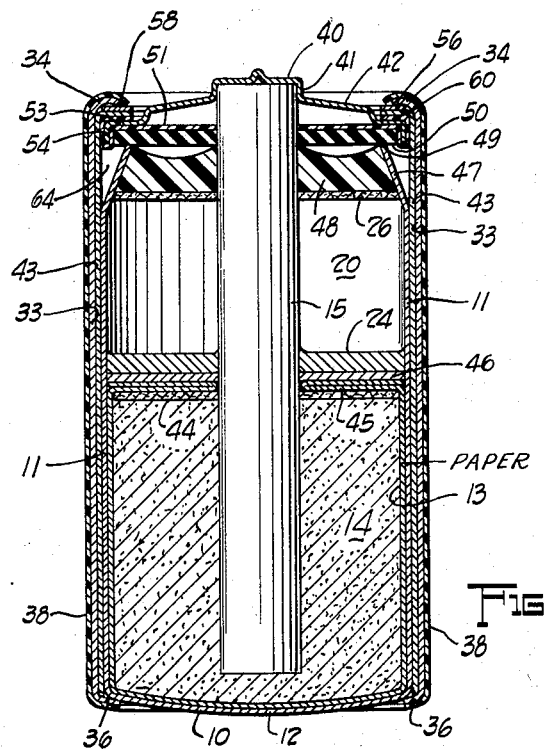
Figure 3 is a sectional view of another form of flashlight cell embodying the invention, parts being broken away to show the internal construction of the cell.
Figure 4:
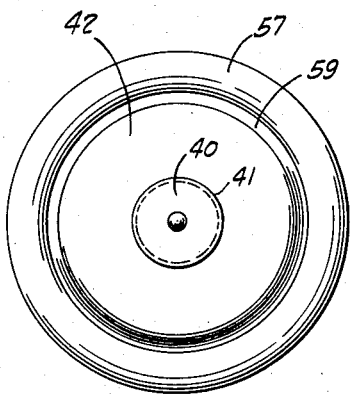
Figure 4 is a top plan view of the cell shown in Figure 3.

Figures 3 and 4 show a modified form of cell embodying the present invention. As in Figures 1 and 2, the basic construction of the cell is generaly conventional, and the same reference characters as used in Figures 1 and 2 have been applied to corresponding parts in Figures 3 and 4. The cell, as before, comprises a zinc can 10 constituting the zinc electrode, with a cylindrical side wall 11 and a bottom 12. The zinc can is lined with a paper separator 13, within which is disposed a mass of depolarizing mix 14 having carbon electrode 15 embedded therein. The carbon electrode projects above the top of the cell as in the previous form of the invention, but in this modification of the invention the upper end of the carbon electrode is enclosed by a metal cap 40 having a cylindrical portion 41 and an outwardly extending flange 42, which constitutes a closure for the upper end of the cell. The side walls of the cell are enclosed within a tubular metal sleeve 33, as before. The upper end of the sleeve is turned inwardly as at 34 to retain the cap 40 in position, explained more fully below; the lower end of the sleeve is turned inwardly as at 36 to engage the bottom 12 of the can and retain the sleeve in place.

The exterior of the sleeve, as before, is preferably insulated by a thin plastic tube 38, and in this modification a paper sleeve 43 is shown as interposed between the sleeve 33 and the side wall 11 of the can.

The paper liner 13 is impregnated with an electrolyte paste as in the previous modification. However, in this form of the invention a washer 44, composed of fiber, kraft paper, chipboard or the like, is disposed immediately above the mass of mix 14, and the paper liner is extended inwardly approximately to the carbon electrode 15 as shown at 45. Above the inwardly extending portion of the liner 45 there is another washer 46 which is preferably composed of waxed paper, and above this is disposed the layer 24 which may be composed of the gelatinous, electrolyte absorbing materials previously noted.

The expansion space 20 is immediately above the paste layer, and the upper limit of the expansion space is defined by a waxed seal washer 26. The zinc can is tapered inwardly in the region of the washer 26, as shown at 47, and the space above the seal washer 26 and between the electrode 15 and portion 47 of the can is filled in with a soft wax seal 48, which preferably is of material having the same characteristics and composition as specified for the seal 22 in the previous modification, "Bi-wax" No. B-1128 being satisfactory.

The upper edge 49 of the zinc can is engaged by a rubber washer 50, on top of which is disposed a thin washer 51 composed of a sheet of flexible plastic insulating material such as a polyvinyl chloride or polyester plastic.

The flat outer portion 53 of the cap 40 engages the upper surface of the washer 51 overlying the edge 49 of the zinc cup. The cap 40 is preferably provided with a depending outer flange 54, and washer 51 is preferably folded upwardly around flange 54 and inwardly over the upper surface of portion 53 of cap 40. Cap 40 is retained in position and the rubber washer 50 is resiliently urged into sealing engagement with the upper edge 49 of the zinc can by the turned in portion 34 of outer metal sleeve 33. A paper insulating washer 56 is interposed between the edge 58 of the metal can and the portion of washer 51 overlying the peripheral portion 53 of the cap 40, thus further insulating the outer metal sleeve 33 from the cap 40. Insulation at this point is necessary inasmuch as the outer sleeve is not insulated from the zinc cup electrode 10. The paper liner 43, when used, is turned inwardly as shown at 60 and is disposed between the washer 56 and the flat portion of the turned-in portion of washer 51.

In this modification of the invention there is no sealing material between the mix 14 and the gelatinous electrolyte-absorbing material 24. As before, the gelatinous material absorbs the spew exuded from the active materials; and while the paste or gelatinous material 24 becomes thinner than it originally was, it remains sufficiently thick and gelatinous so that it cannot readily leak past the seal provided by the soft wax 48 and by the rubber washer 50 which is compressed against the upper edge 49 of the zinc can 10. In this type of cell no vent is provided in the cap 40; excess gases can pass through the soft seal 48 and the excess pressure is relieved by the action of the rubber washer 50 and cap 40 which permit gas to escape when the pressure within the cell becomes excessive. Under most circumstances the spew, which has been thickened by the gelatinous material 24, is entirely prevented from reaching the exterior of the zinc cup by the soft seal 48 and by the seal provided by the rubber washer 50 and the edge 49. However, any spew that may possibly find its way past these two seals is retained in the space 64 between the metal sleeve 56 or its paper lining 43 and the inwardly deflected portion 47 of the cup 10.

From the foregoing it will be evident that the invention provides dry cells which are leakproof under conditions ordinarily encountered in service. Inasmuch as gases are vented from the cells when necessary, and since the expansion space is larger than usual in proportion to the total volume of the cells, excessive pressures are not developed within the cells in use. The zinc cans are constructed so that they do not perforate. The immobilization of the spew discharged from the active materials makes it possible to retain the spew within the cell while, at the same time, gases are discharged therefrom. These results are obtained in cells having favorable shelf life and capacity characteristics and which can be manufactured at reasonable cost.

Those skilled in the art will appreciate that various changes and modifications may be made in the preferred forms of the invention disclosed herein without departing from the spirit or scope of the invention. The essential characteristics of the invention are summarized in the appended claims.

We claim:

1. A dry cell comprising a zinc cup constituting an electrode, a mass of mix and a carbon electrode within the cup, a paper lining impregnated with paste electrolyte interposed between the mass of mix and the interior of the cup, an expansion space within the zinc cup above the mass of mix, a layer of cereal paste disposed within the cup between the mass of mix and the expansion space and a layer of soft plastic sealing material between the mass of mix and the layer of cereal paste, said layer of sealing material extending between said carbon electrode and the interior of said zinc cup.

2. A dry cell comprising a zinc cup constituting an electrode, a mass of mix and a carbon electrode within the cup, electrolyte disposed between the mass of mix and the interior of the cup, an expansion space within the zinc cup above the mass of mix, a layer comprising gelatinous electrolyte-absorbing material and water disposed within the cup between the mass of mix and the expansion space and a layer of soft plastic sealing material between the mass of mix and the layer of electrolyte-absorbing material, said layer of sealing material extending between said carbon electrode and the interior of said zinc cup.

3. A dry cell comprising a zinc cup constituting an electrode, a mass of mix, a carbon electrode within the cup, a paper lining impregnated with paste electrolyte interposed between the mass of mix and the interior of the cup, an expansion space within the zinc cup above the mass of mix, a layer comprising gelatinous, electrolyte-absorbing material and water disposed within the cup between the mass of mix and the expansion space, a layer of soft plastic wax sealing material between the mix cake and the layer of gelatinous, electrolyte-absorbing material, and a wax seal at the top of the zinc cup bonded to the inner surface of the zinc cup and to the carbon electrode.

4. A dry cell comprising a zinc cup constituting an electrode, a mass of mix and a carbon electrode within the cup, a paper lining impregnated with paste electrolyte interposed between the mass of mix and the interior of the cup, an expansion space within the zinc cup above the mass of mix, a layer comprising gelatinous electrolyte-absorbing material and water disposed within the cup between the mass of mix and the expansion space, a layer of soft plastic wax sealing material between the mix cake and the layer of electrolyte-absorbing material, a seal at the top of the zinc cup, an outer steel sleeve surrounding and engaging said zinc cup and having its upper edge turned inwardly into contact with the upper surface of said top seal and its bottom edge turned inwardly into contact with the bottom of said zinc cup, and a sleeve of insulating material surrounding said outer steel sleeve.

5. A dry cell comprising a zinc cup constituting an electrode, a mass of mix and a carbon electrode within the cup, a paper lining impregnated with paste electrolyte interposed between the mass of mix and the interior of the cup, an expansion space within the zinc cup above the mass of mix, a layer of paste electrolyte disposed within the cup between the mass of mix and the expansion space, a layer of soft plastic wax sealing material between the mix cake and the layer of electrolyte paste, a wax seal at the top of the zinc cup bonded to the inner surface of the zinc cup and to the carbon electrode, the upper edge of the zinc cup being turned inwardly, a plastic top imbedded in said wax seal and having peripheral portion extending over the turned in upper edge of said zinc cup, an outer steel sleeve surrounding and engaging said zinc cup and having its upper edge turned inwardly into contact with the upper surface of said plastic top and its bottom edge turned inwardly into contact with the bottom of said zinc cup, and a sleeve of insulating material surrounding said outer steel sleeve.

6. A dry cell comprising a zinc cup constituting an electrode, a mass of mix and a carbon electrode within the cup, a paper lining impregnated with paste electrolyte interposed between the mass of mix and the interior of the cup, an expansion space within the zinc cup above the mass of mix, a layer of paste electrolyte disposed within the cup between the mass of mix and the expansion space, a layer of soft plastic wax sealing material between the mix cake and the layer of paste, a wax seal at the top of the zinc cup bonded to the inner surface of the zinc cup and the carbon electrode, the upper edge of the zinc cup being turned inwardly, a plastic top imbedded in said wax seal and having peripheral portion extending over the turned in upper edge of said zinc cup and an outer sleeve surrounding said zinc cup and having its upper edge turned inwardly into contact with the upper surface of said plastic top and its bottom edge turned inwardly into contact with the bottom of said zinc cup.

7. A dry cell comprising a zinc cup constituting an electrode, a mass of mix and carbon electrode within the cup, means for sealing the top of the cup, a paper lining impregnated with paste electrolyte interposed directly between the mass of mix and the interior of the cup, a washer directly overlying the top of the mass of mix, the mass of mix and the washer being spaced below the sealing means to provide an expansion space within the zinc cup above the mass of mix, and a layer of gelatinous consistency comprising gelatinous electrolyte-absorbing material and water disposed within the expansion space and overlying said washer and said mass of mix, said layer occupying substantially less than the entire volume of said expansion space and leaving an empty expansion space of substantial volume within the cup above said layer and below said sealing means.

8. A dry cell according to claim 7 wherein the gelatinous, electrolyte-absorbing material is composed of paste electrolyte.

9. A dry cell according to claim 7 wherein the gelatinous, electrolyte-absorbing material is composed of methylcellulose.

10. A dry cell according to claim 7 wherein the gelatinous, electrolyte-absorbing material is composed of carboxymethylcellulose.

11. A dry cell according to claim 7 wherein the gelatinous, electrolyte-absorbing material is composed of polyvinyl alcohol.

12. A dry cell according to claim 7 wherein the gelatinous, electrolyte-absorbing material is composed of a natural gum.

13. A dry cell according to claim 7 wherein the gelatinous, electrolyte-absorbing material is from the group consisting of cereal paste, gum tragacanth, jaguar gum, methylcellulose, carboxymethylcellulose, and polyvinyl alcohol.

References Cited in the file of this patent

UNITED STATES PATENTS

| | | |
|---|---|---|
| 1,766,418 | Weissmann | June 24, 1930 |
| 2,262,836 | Deibel | Nov. 18, 1941 |
| 2,542,934 | MacFarland | Feb. 20, 1951 |
| 2,704,780 | MacFarland | Mar. 22, 1955 |
| 2,712,034 | Seavey et al. | June 28, 1955 |

FOREIGN PATENTS

| | | |
|---|---|---|
| 623,888 | Great Britain | May 24, 1949 |

OTHER REFERENCES

Alexander, J.: "Colloid Chemistry," Reinhold Publishing Co., New York, 1946, vol. III, pages 275–276, vol. VI, page 533.